Aug. 25, 1942. J. L. YATES ET AL 2,294,152
GAS ENGINE SHUT DOWN DEVICE
Filed Aug. 5, 1939 6 Sheets-Sheet 1

James L. Yates
Harry P. Yount
INVENTOR
BY
ATTORNEY

James L. Yates
Harry P. Yount
INVENTORS

BY
ATTORNEY

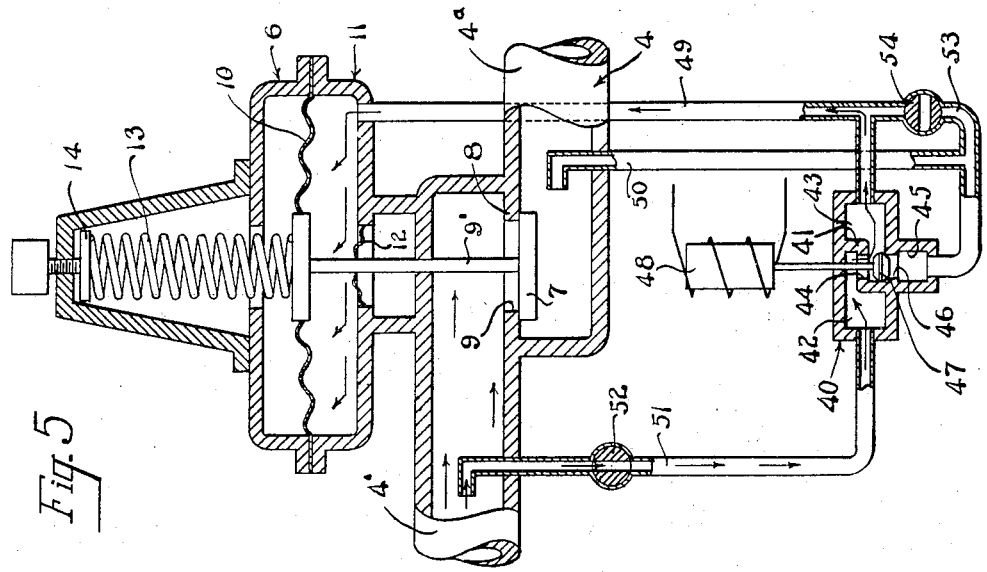
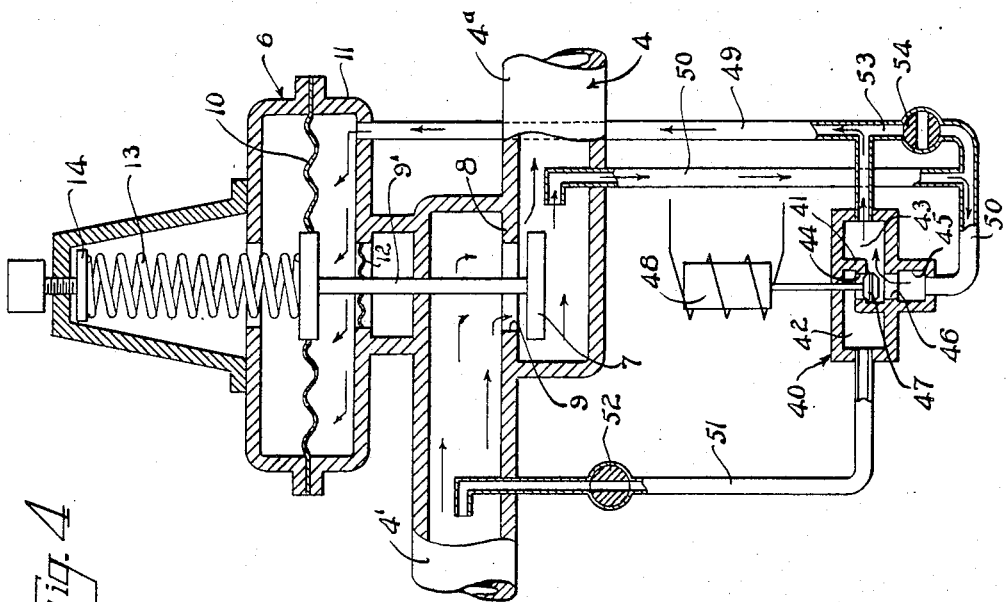

Aug. 25, 1942.   J. L. YATES ET AL   2,294,152
GAS ENGINE SHUT DOWN DEVICE
Filed Aug. 5, 1939   6 Sheets-Sheet 4

James L. Yates
Harry P. Yount
INVENTORS

BY *Robe Yunger*
ATTORNEY

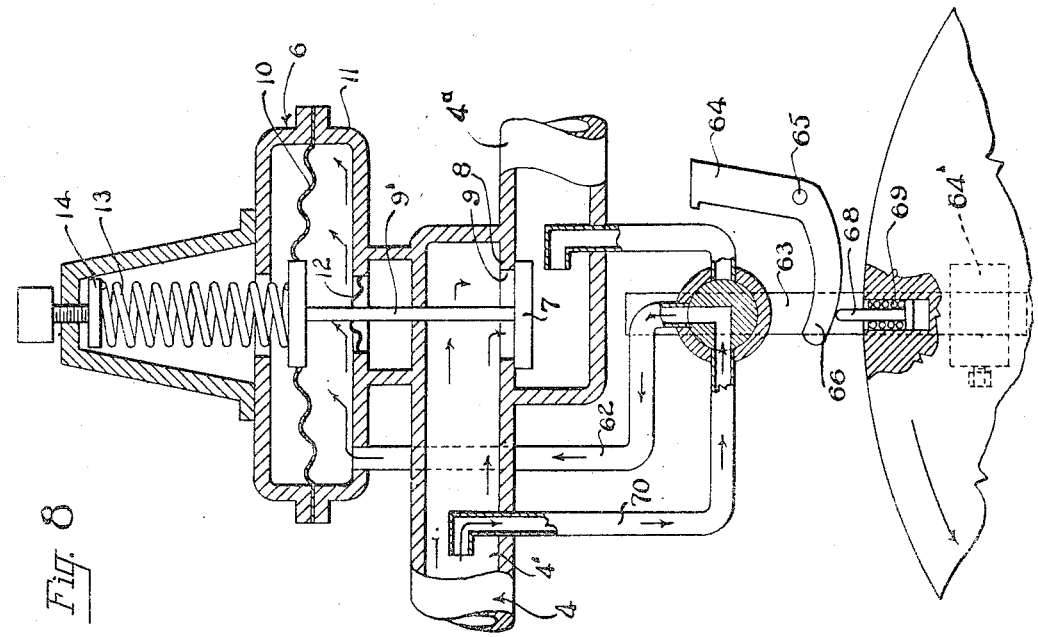
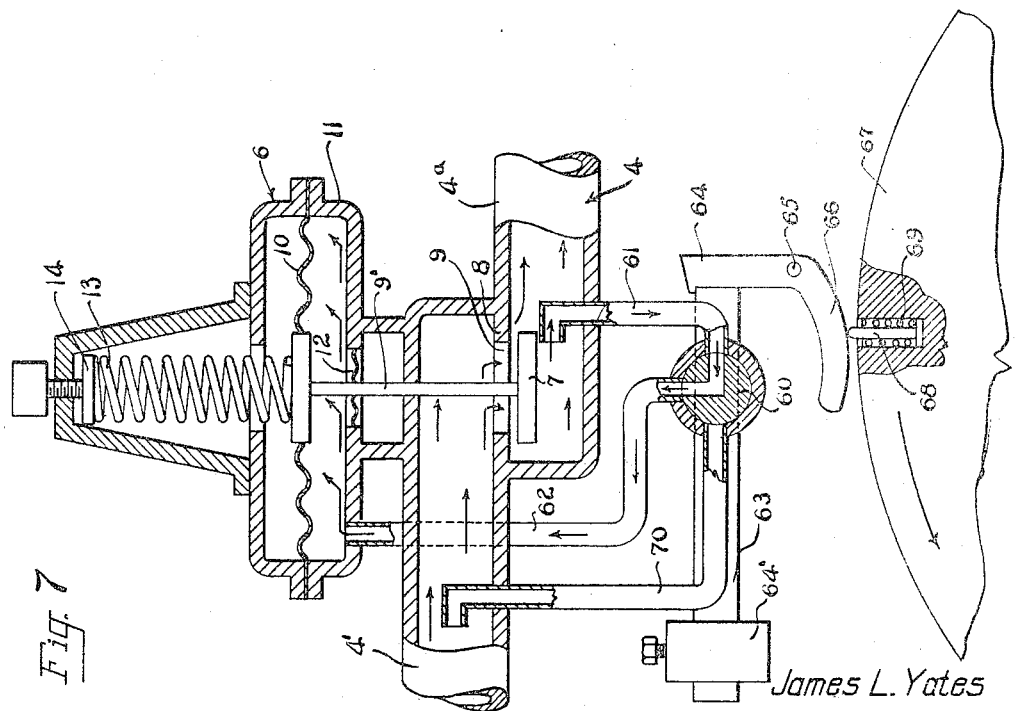

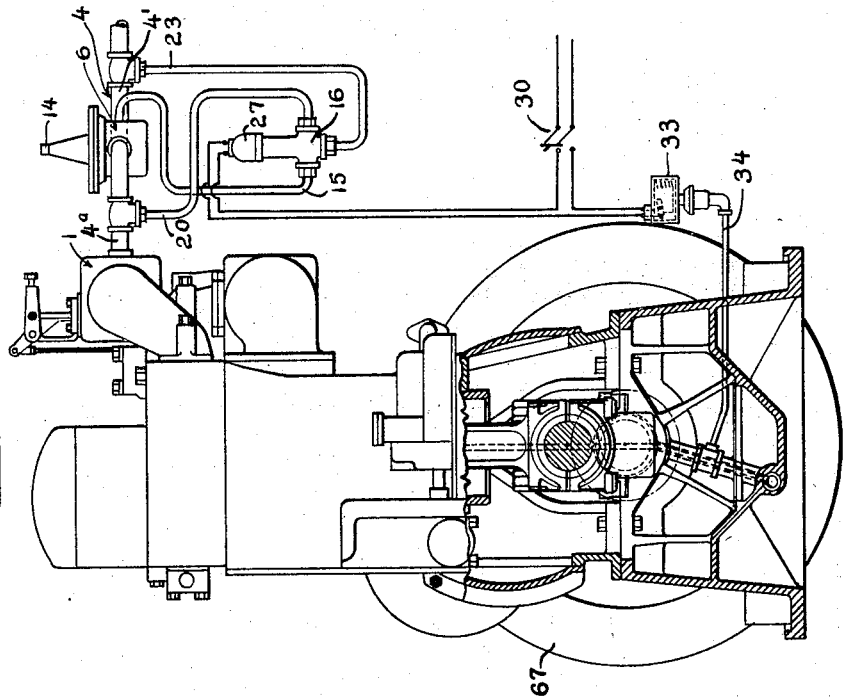
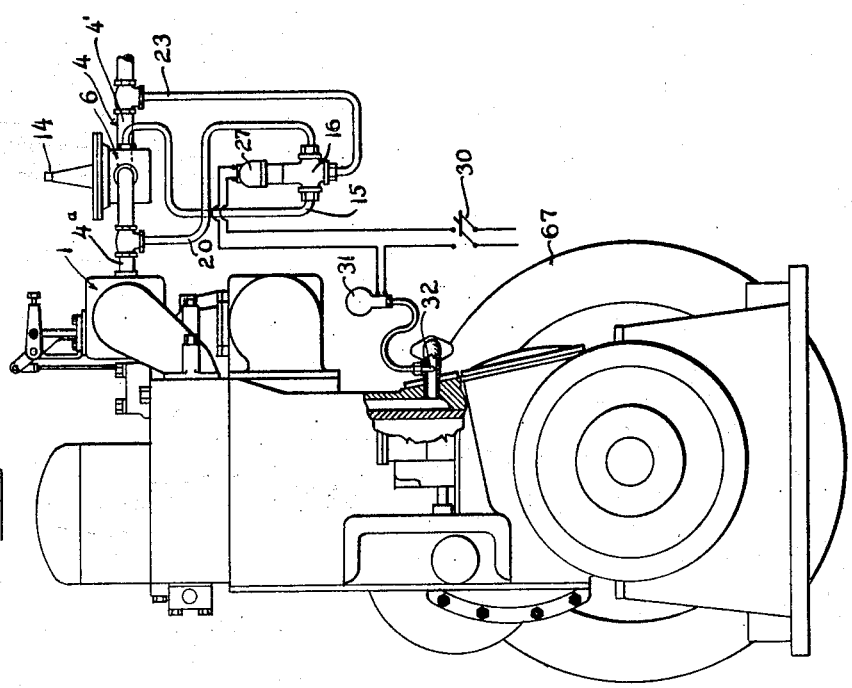

Patented Aug. 25, 1942

2,294,152

UNITED STATES PATENT OFFICE 2,294,152

GAS ENGINE SHUTDOWN DEVICE

James L. Yates, Kenmore, and Harry P. Yount, Buffalo, N. Y., assignors to Worthington Pump and Machinery Corporation, Harrison, N. J., a corporation of Delaware Application August 5, 1939, Serial No. 288,536

6 Claims. (Cl. 123—198)

This invention relates to internal combustion engines and more particularly to internal combustion engines commonly known as gas engines, which employ various types of gases as fuel. An object of the present invention is to provide means for automatically cutting off the supply of gas to the engine upon failure of the engine for any of various reasons thereby preventing the pumping of gas into the exhaust line of the engine after ignition is cut off.

More specifically, an object of the present invention is to provide, in combination with a pressure actuated regulator controlling the supply of gas to an engine, means actuated upon failure of various parts of the engine's system such as the ignition system, cooling water circulation, lubricating oil circulation or the like, to cause a reversal of the gas pressure on the pressure actuated gas control regulator to cut off the supply of gas to the engine.

Another object of the present invention is to provide means actuated by overspeeding of the engine, that is, operation of the engine above a predetermined speed, which means will, in cooperation with the pressure actuated gas regulator, cut off the supply of gas to the engine.

With these and other objects in view, as may appear from the accompanying specification, the invention consists of various features of construction and combination of parts, which will be first described in connection with the accompanying drawings, showing a gas engine shut down device of the preferred form embodying the invention, and the features forming the invention will be specifically pointed out in the claims.

In the drawings:

Figure 4 is a view similar to Figure 2 showing a slight modification of the control mechanism positioned during normal engine operation.

Figure 5 is a view of the modification of the construction shown in Figure 4, showing the control mechanism in position to cut off the delivery of gas to the engine.

Figure 7 is a sectional view partly in diagram of a modified construction of the gas delivery control means showing an overspeed mechanism whereby the flow of gas will be cut off upon overspeeding of the engine, showing the parts in the position assumed during normal operation of the engine.

Figure 8 is a view similar to Figure 7, showing the gas control mechanism operated by overspeeding of the engine to cut off the delivery of gas to the engine.

Figure 9 is an end elevation, partly in section, of a gas engine showing connection of the gas flow control means in combination with means actuated by the circulating cooling water of the engine.

Figure 10 is an end elevation, partly in section, of a gas engine showing the gas control mechanism associated therewith, and showing means operated by the lubricating oil system of the engine for controlling the gas control mechanism.

Figure 1:
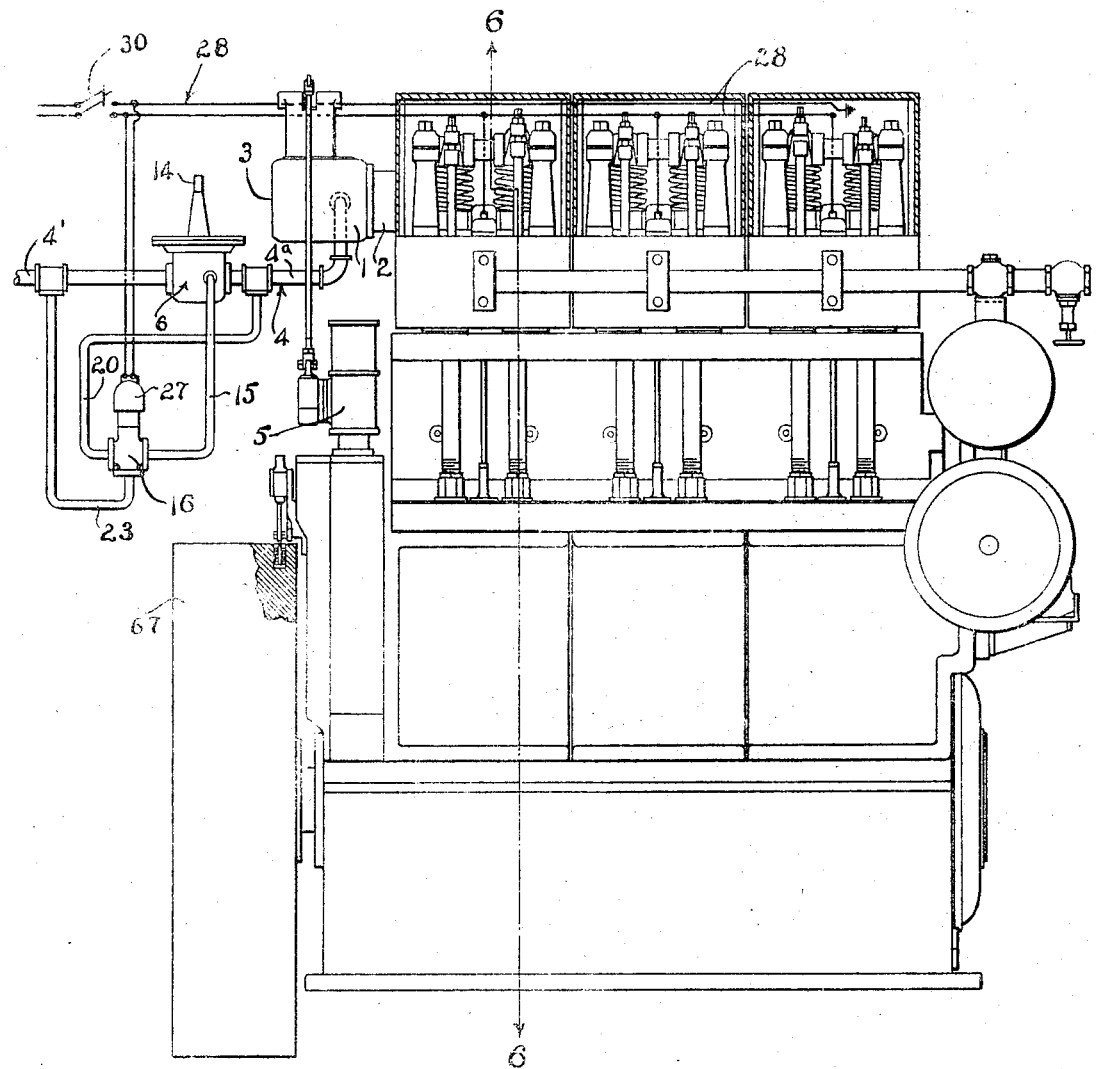
Figure 1 is a side elevation of a gas engine showing the invention applied thereto.
Figure 6:
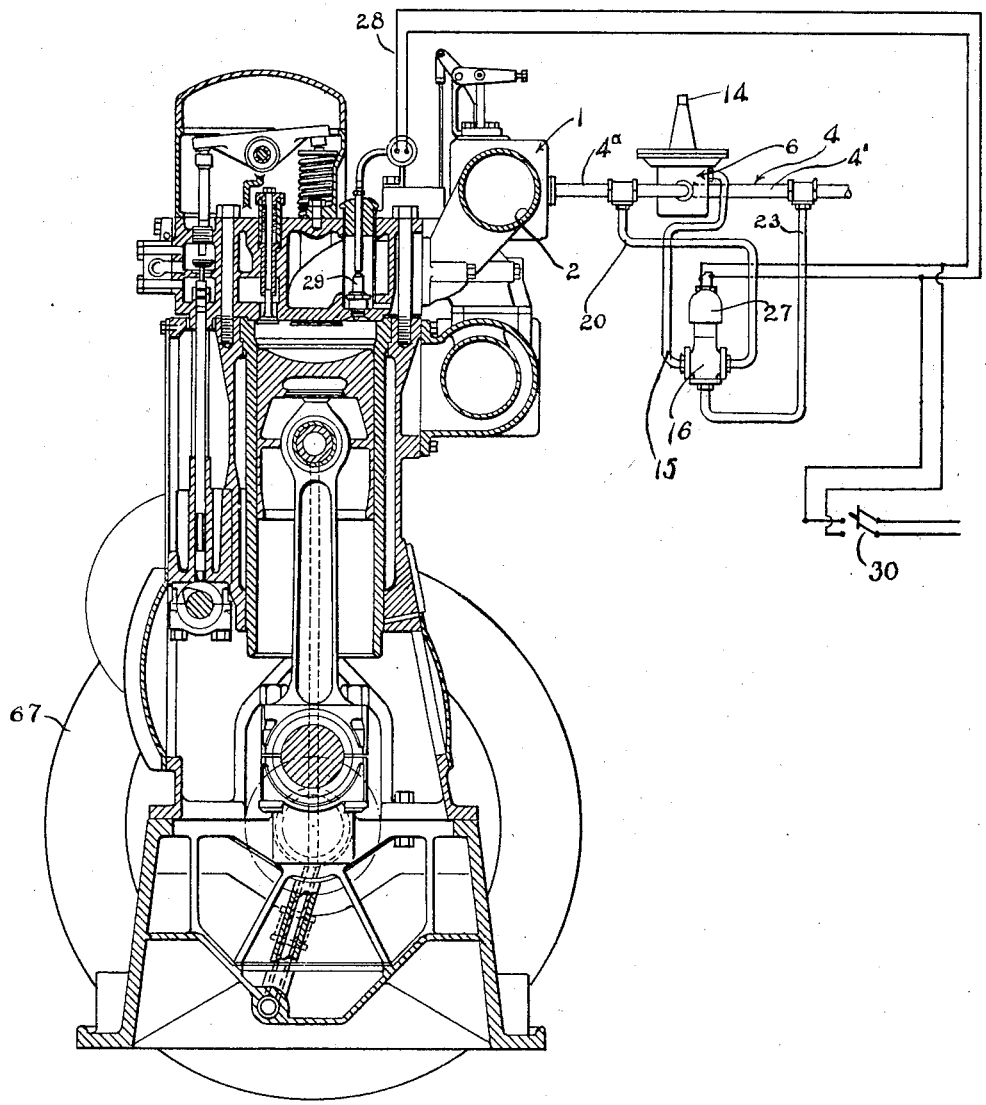
Figure 6 is a vertical section through a gas engine showing the gas control mechanism connected with the electrical ignition circuit of the engine for operation thereby.

Referring more particularly to the drawings, an internal combustion engine of any approved type utilizing gas mixed with air as a fuel is shown in Figures 1 and 6 of the drawings, and since the specific features of the engine form no part of the present invention, the engine will not be specifically described.

As in internal combustion engines of this type, the fuel is delivered to the various cylinders of the engine through a mixing valve 1, the discharge of which opens into the intake manifold of the engine. The air enters the mixing valve in the usual manner through the open end 3, while the gas enters the mixing valve through a gas line 4.

The mixing valve 1 may be of any approved construction commonly in use in connection with internal combustion engines of this type, which mixing valve structure proportions the amounts of air and gas and mixes them prior to delivery to the intake manifold 2 of the engine. As is usual in engines of this type the operation of the mixing valve is controlled through any approved type of governor mechanism 5 carried and operated by the engine for properly proportioning the air and gas.

The present invention further contemplates the employment of a pressure actuated regulator 6 in the gas line 4 in advance of the mixing valve 1. This pressure actuated regulator 6 may be of any approved type, such as the "Crawford" regulator, which may be purchased upon the open market.

Figure 3:
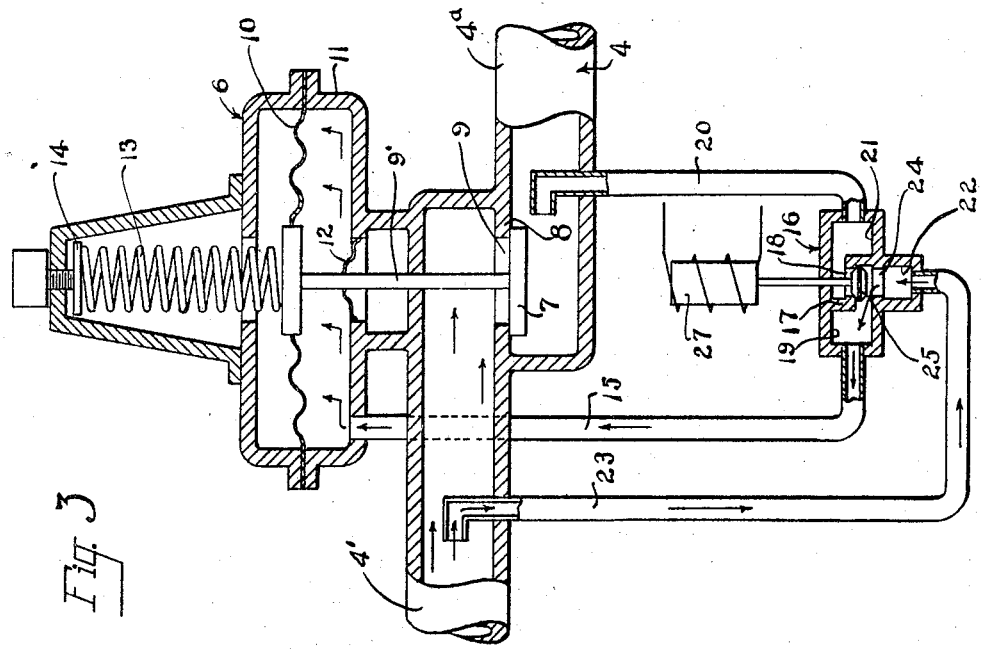
Figure 3 is a view similar to Figure 2 showing the parts in position assumed when the mechanism operates to cut off the delivery of gas to the engine.
Figure 2:
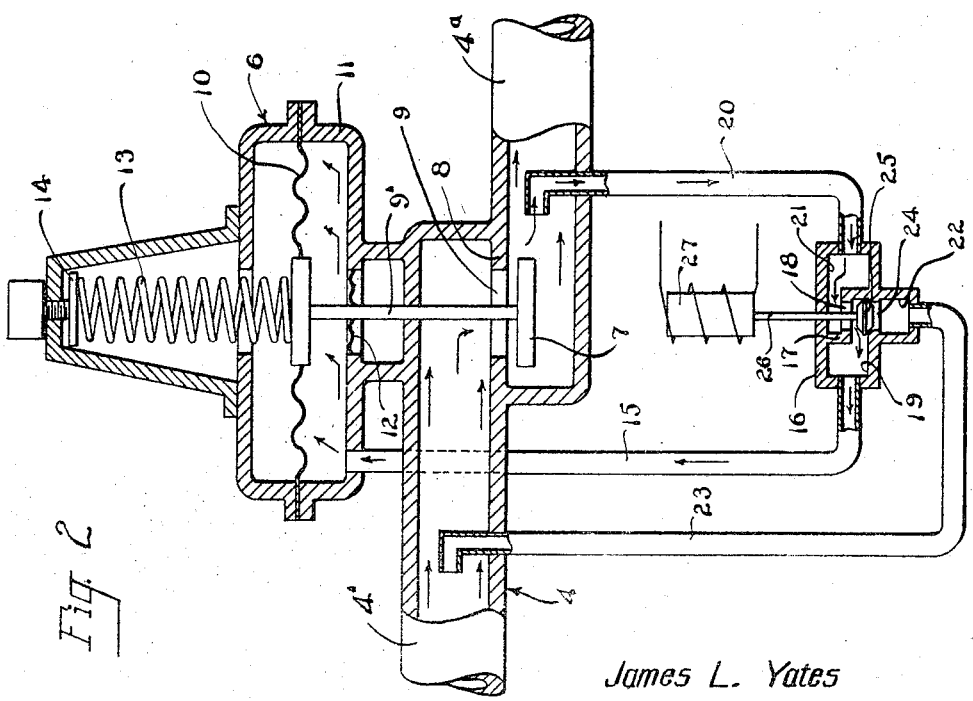
Figure 2 is an enlarged section, partly in diagram, showing the means for shutting off the supply of gas upon failure of the engine for various reasons and showing the position of the parts during normal engine operation.

The pressure actuated regulator 6 is shown in section in Figures 2 and 3 of the drawings, and it comprises a valve 7 which coacts with a valve seat 8. The port 9 in the valve seat 8 provides communication between the high pressure side 4' of the gas line 4 and the low pressure side 4ª of said gas line. The low pressure side 4ª of the gas line 4 is the portion of the gas line between the valve 7 and the mixing valve 1, which is the portion of the gas line from which the gas is drawn by the action or operation of the gas engine proper, and since the gas is fed to the engine under pressure from any suitable gas supply source (not shown), the portion of the gas line 4 between the valve 7 and the source of supply will be the high pressure side of the gas line.

The valve stem 9 of the valve 7 is connected to a diaphragm 10, which is mounted in a suitable casing 11 sealed from the gas line 4 in any suitable manner such as shown at 12. A spring 13 acts on the diaphragm 10 and tends to unseat the valve 7. The tension of the spring 13 may be regulated as desired by an adjustable tensioning means 14.

A conduit 15 opens into the diaphragm chamber 11 on the side of the diaphragm 10 oppositely from the spring 13 and also opens into a valve chamber 16. The chamber 16 has a ported partition 17 therein dividing it into two separate compartments, communication between which is established by the port 18 in the partition. The conduit 15 opens into the chamber 19 of the valve chamber 16, while a conduit 20 opens into the chamber 21 upon the opposite side of the partition 17 from the chamber 19. The conduit 20 opens into the low pressure side 4ᵃ of the gas line 4 opposite to the direction of flow of gas therethrough.

A third chamber 22 is formed in the valve housing 16 and a conduit 23 opens into the chamber 22. The conduit 23 also opens into the high pressure side 4' of the gas line 4. Communication between the chambers 19 and 22 is established by a port 24. The ports 18 and 24 are controlled by a valve 25, the stem 26 of which is connected to a solenoid 27 so that the valve 25 is operated by the solenoid 27.

When the engine is operating normally the valve 25 is down (see Fig. 2 of the drawings) cutting off communication between the chambers 19 and 22 and opening communication between the chambers 19 and 21. Thus, at this time, gas from the low pressure side 4ᵃ of the gas line 4 will flow through the conduit 20 and through the valve housing 16 and conduit 15 into the diaphragm chamber 11 beneath the diaphragm 10 opposing the action of spring 13. The combined tension of the spring 13 and the pressure of the gas on the under side of the diaphragm 10 will raise or lower the valve 7, this raising or lowering being dependent on the pressure of the gas on the under side of the diaphragm 10. By this means the flow of gas to the mixing valve 1 and consequently to the engine is increased or decreased, depending on the pressure present in the low pressure side 4ᵃ of the gas line 4. The pressure at which the flow will be maintained is predetermined by adjusting the spring 13 so as to lift a greater or lesser part of the weights of the diaphragm 10, stem 9' and valve 7.

However, if for any one of a number of reasons, some of which will be specifically stated hereinafter, the engine fails, the valve 25 will be moved by the action of the solenoid 27 to close the port 18 and open the port 24 (see Fig. 3 of the drawings). Thus gas from the low pressure side 4ᵃ of the gas line 4 will be cut off from the diaphragm contained in chamber 11 and communication will be established between the chambers 19 and 22, allowing gas from the high pressure side 4' of the gas line to flow through the conduit 23, chambers 22 and 19 and conduit 15 into the chamber 11 below the diaphragm 10. The pressure of gas from the high pressure side 4' of the gas line 4 forces the diaphragm 10 upwardly and moves the valve 7 against its seat to close the port 9 and cut off communication between the high pressure side 4' and the low pressure side 4ᵃ of the gas line 4, consequently cutting off the flow of gas into the engine.

The operation of the solenoid 27 may be controlled from various parts or systems of the engine proper. In Fig. 1 of the drawings the solenoid is shown connected in circuit with the ignition system, generically indicated at 28, of the engine. Upon failure of the ignition system or the cutting off of the flow of electricity to the spark plugs 29, such as by a switch indicated at 30, the flow of gas to the engine will be cut off, thereby preventing the passage of unexploded gas through the engine to the exhaust line.

In Fig. 9 of the drawings the solenoid 27 is illustrated as connected in circuit with a temperature or thermal actuated switch mechanism 31, of any approved construction which may be purchased upon the open market, the valve 32 of which is inserted in the water circulating system of the engine. Upon overheating of the cooling water for any reason the flow of gas to the engine will be cut off. The circuit between the solenoid 27 and the thermal actuated switch structure 31 is shown in dot-and-dash lines in Figure 6 of the drawings.

In Figure 10 of the drawings the solenoid 27 is shown connected in circuit with a pressure actuated switch structure 33 which is in turn connected by a suitable connection 34 with the lubricating oil system of the engine so that upon failure of the lubricating system of the engine for any reason whatsoever the solenoid 27 will be actuated to cut off the flow of gas to the engine.

While a thermal switch structure 31 is shown connected with the cooling water circulating system of the engine and a pressure operated switch 33 is shown connected in the lubricating system of the engine, it is to be understood that either a pressure or thermal switch structure of approved type may be employed in connection with the cooling water circulating system or with the lubricating system of the engine in lieu of those shown, without departing from the spirit of the present invention.

In the constructions shown in Figures 2 and 3 of the drawings the current through the solenoid 27 is cut off during normal operation, while in the modified form of the construction shown in Figures 4 and 5 the electrical current through the solenoid is on during normal operation. In the structures shown in Figures 4 and 5 the construction and operation of the pressure actuated control device 6 is the same as that shown in Figures 2 and 3 and consequently the same reference characters will be applied thereto, the differences between the forms shown in Figures 2 and 3 and those of the modified construction shown in Figures 4 and 5 residing in the arrangement of the various conduits and the valve housing.

The valve housing 40 has a partition 41 therein dividing the interior of the housing into chambers 42 and 43, which are adapted to have communication through the port 44 in the partition 41, while the chamber 45 has communication with the chamber 43 through the port 46. The valve 47 controls the ports 44 and 46 and is actuated by the solenoid 48. When the engine is operating normally the solenoid 48 is energized and the valve 47 closes the port 44, cutting off communication between the chambers 42 and 43 and opening communication between the chambers 43 and 45. The chamber 43 has a connection through a conduit 49 with the interior of the diaphragm enclosing housing 11, while the chamber 45 has communication through a conduit 50 with the low pressure side 4ª of the gas supply line 4, so that when the valve 47 is in its upward position low pressure gas will flow through the conduit 50 through the chambers 45 and 43 and conduit 49 into the housing 11, where, dependent on the pressure of gas present in the low pressure side 4ª of the gas supply line 4, this pressure of the gas will control the position of the valve 7 and gas will be fed to the engine in the usual manner, dependent on the amount required for operation. The chamber 42 has communication with the high pressure side 4' of the gas line 4 through a suitable conduit 51. A manually operable valve 52 is interposed in the conduit 51 for cutting off communication between the high pressure side 4' and the chamber 42 for rendering the gas cut-off mechanism inactive.

A branch conduit 53 establishes communication between the conduit 49 and the conduit 50 in advance of the chamber 45. This branch conduit 53 has a manually operable valve 54 therein by means of which the by-pass conduit 53 may be rendered inactive. By operation of the manually operable valve 54 direct communication may be established between the space within the housing 11 below the diaphragm 10 and the low pressure side 4ª of the gas supply line 4 independently of the valve 47 and the respective chambers of the valve housing 40.

Fig. 4 of the drawings, as previously stated, shows the mechanism in the position assumed during normal operation of the engine, while Fig. 5 of the drawings shows the position of the various parts when the engine is shut down or fails for any reason. At such time the solenoid 48 is deenergized and the valve 47 falls, cutting off communication between the chambers 45 and 43, and consequently cutting off communication between the space within the housing 11 below the diaphragm 10 and the low pressure side 4ª of the gas line 4. When the valve 47 is in its lower position communication is opened between the chambers 42 and 43 through the port 44, with the result that gas from the high pressure side 4' of the gas line 4 passes through the conduit 51, chambers 42 and 43 and through the port 44, with the result that gas from the high pressure side 4' of the gas line 4 passes through the conduit 51, chambers 42 and 43 and conduit 49 into the housing 11, and acts on the diaphragm 10 together with the action of the spring 13 and moves the valve 7 on its seat to close the port 9 and cut off the flow of gas to the engine.

All of the structures shown in Figs. 1 to 6 inclusive and above described embody means operated by electrical energy, namely the solenoids for controlling the reversal of the flow of gas into the housing 11, while the construction shown in Figs. 7 and 8 show an overspeed mechanism for controlling the reversal of the flow of gas into the pressure actuated control mechanism or device 6.

In these Figs. 7 and 8 the pressure actuated control device 6 is the same as in all of the other figures, comprising the housing 11 in which is mounted the diaphragm 10, to which the valve 7 is connected. The valve 7 controls the port 9 and consequently controls the flow of gas to the engine. The valve 7 is connected to the diaphragm 10 by the valve stem 9' and controls the flow of gas through the port 9 a sufficient amount, dependent upon the pressure of gas in the low pressure side 4ª of the gas supply conduit 4 to permit the flow of gas to the mixing valve 1 and consequently to the engine.

The construction shown in Figs. 7 and 8 comprises a three-way rotary valve 60 which controls the delivery of gas into the space within the housing 11 beneath the diaphragm 10. The conduit 61 opens into the low pressure side 4ª of the gas supply conduit 4 and when the engine is operating at normal speed (see Fig. 7) communication is established between the space within the housing 11 below the diaphragm 10 and the low pressure side 4ª through the valve 60 and conduit 61 and the conduit 62.

The valve 60 has a lever 63 connected thereto on the outer end of which is a weight 64'. Under normal operating conditions of the engine, that is, when the engine is operating at the predetermined speed, the lever 63 is held in its upper horizontal position by means of a latch 64. The latch 64 is pivotally supported at 65 to any suitable point on or about the engine. The upper end of the latch engages the lever 63 and holds it in its horizontal position, as shown in Figure 7 of the drawings, subjecting the diaphragm 10 to the pressure of gas from the low pressure side of the engine. The latch 64 has a shoe 66 thereon which is positioned over the perimeter of the fly wheel 67 of the engine. The fly wheel 67 of the engine carries a tripping pin 68 which is normally held in its inward position by a spring 69. When the speed of the engine and consequently of the fly wheel 67 exceeds the predetermined speed for which the device is set the centrifugal action acting on the trip pin 68 forces it outwardly against the action of the spring 69 to engage the shoe 66 of the latch 64 and tripping the latch off the end of the lever 63. When the latch 64 moves off the end of the lever 64 the weight 64' will move the lever into its vertical or downward position, rotating the valve 60 and establishing communication between the conduits 62 and 70. The conduit 70 has communication with the high pressure side 4' of the gas supply line 4. Thus when the latch 64 is tripped the higher pressure gas will flow through the conduit 70, valve 60 and conduit 62 and act upon the diaphragm 10 for moving the valve 7 upon its seat and closing the port 9, cutting off the supply of gas to the engine.

In all of the forms shown in the drawings and described, the supply of gas to the engine is controlled by reversal of the flow of gas to the automatic pressure actuated control device so that either upon failure of any one of a number of parts of the entire engine the delivery of the gas to the engine will be cut off.

It will be understood that the invention is not to be limited to the specific construction or arrangement of parts shown, but that they may be widely modified within the invention defined by the claims.

What is claimed is:

1. In combination with an internal combustion engine utilizing gas under pressure as fuel and having a gas supply line to the engine, of a valve interposed in said gas supply line for controlling the supply of gas to the engine, pressure actuated means for operating said valve, a gas by-pass for delivering gas under pressure to said pressure actuated means and being open to the low pressure side of the gas supply line during normal operation of the engine whereby said pressure actuated means will be under action of the low pressure gas, and means interposed in said by-pass and operable upon abnormal conditions detrimental to engine operation to close said by-pass to the low pressure side of the gas line and open it to the high pressure side of the gas line to permit passage of gas to the pressure actuated means for actuating the pressure actuated means to cut off the delivery of gas to the engine.

2. In combination with an internal combustion engine utilizing gas under pressure as fuel and having a gas supply line to the engine, of a valve interposed in said gas supply line for controlling the supply of gas to the engine, pressure actuated means for operating said valve, a gas by-pass for delivering gas under pressure to said pressure actuated means and being open to the low pressure side of the gas supply line during normal operation of the engine whereby said pressure actuated means will be under action of the low pressure gas, a valve in said by-pass and held in position to open the by-pass to permit passage of gas from the low pressure side of the gas line to said pressure actuated means when the engine is running normally, and means for actuating said valve upon abnormal operating conditions of the engine to operate said valve to open the by-pass to permit passage of gas from the high pressure side of the gas line to said pressure actuated means to cut off the supply of gas to the engine.

3. In combination with an internal combustion engine utilizing gas under pressure as fuel, a gas supply line to the engine, a mixing valve for mixing and controlling delivery of fuel to the engine, a control valve in the supply line outwardly of said mixing valve providing a high pressure side in the fuel supply line in advance of the valve and a low pressure side in the fuel supply line between the valve and the mixing valve, a sealed chamber, means operative under normal operation of the engine to admit fuel gas from the low pressure side of the fuel line to said chamber, a pressure actuated member in said chamber and tensioned to hold said valve open when the chamber is receiving gas from the low pressure side of the supply line, said means operative under abnormal conditions detrimental to engine operation to admit gas from the high pressure side of the fuel line to said chamber for actuating said pressure actuated means to close the valve.

4. In combination with an internal combustion engine utilizing gas under pressure as fuel, a gas supply line to the engine, a mixing valve for mixing and controlling delivery of fuel to the engine, a control valve in the supply line outwardly of said mixing valve providing a high pressure side in the fuel supply line in advance of the valve and a low pressure side in the fuel supply line between the valve and the mixing valve, a sealed chamber, a valve chamber having an inlet communication with both the high pressure side and the low pressure side of said fuel supply line, an outlet communication with said sealed chamber to deliver fuel gas under pressure to the sealed chamber, a valve in said valve chamber, means for actuating said valve in said valve chamber to admit fuel gas from the low pressure side of the fuel line to said sealed chamber when the engine is operating under normal conditions and to admit gas from the high pressure side of the fuel line to the sealed chamber when the engine is operating under abnormal conditions, a pressure actuated member in said sealed chamber and tensioned to hold said fuel line valve open when the sealed chamber is receiving fuel gas from the low pressure side of the line and to close the valve when the sealed chamber is receiving gas from the high pressure side of the line.

5. In combination with an internal combustion engine utilizing gas under pressure as fuel, a gas supply line to the engine, a mixing valve for mixing and controlling delivery of fuel to the engine, a control valve in the supply line outwardly of said mixing valve providing a high pressure side in the fuel supply line in advance of the valve and a low pressure side in the fuel supply line between the valve and the mixing valve, a sealed chamber, a valve chamber having an inlet communication with both the high pressure side and the low pressure side of said fuel supply line, an outlet communication with said sealed chamber to deliver fuel gas under pressure to the sealed chamber, a valve in said valve chamber, means operative by predetermined operating conditions of the engine for actuating said valve in said valve chamber to admit fuel gas from the low pressure side of the fuel line to said sealed chamber when the engine is operating under normal conditions and to admit gas from the high pressure side of the fuel line to the sealed chamber when the engine is operating under abnormal conditions, a pressure actuated member in said sealed chamber and tensioned to hold said fuel line valve open when the sealed chamber is receiving fuel gas from the low pressure side of the line and to close the valve when the sealed chamber is receiving gas from the high pressure side of the line.

6. In combination with an internal combustion engine utilizing gas under pressure as fuel, a gas supply line to the engine, a mixing valve for mixing and controlling delivery of fuel to the engine, a control valve in the supply line outwardly of said mixing valve providing a high pressure side in the fuel supply line in advance of the valve and a low pressure side in the fuel supply line between the valve and the mixing valve, a sealed chamber, a valve chamber having an inlet communication with both the high pressure side and the low pressure side of said fuel supply line, an outlet communication with said sealed chamber to deliver fuel gas under pressure to the sealed chamber, a valve in said valve chamber, a solenoid subject to operation upon predetermined operating conditions of said engine for actuating said valve in said valve chamber to admit fuel gas from the low pressure side of the fuel line to said sealed chamber when the engine is operating under normal conditions and under abnormal conditions detrimental to operation of the engine to admit gas from the high pressure side of the fuel line to said sealed chamber, a pressure actuated member in said sealed chamber and tensioned to hold said fuel line valve open when the sealed chamber is receiving fuel gas from the low pressure side of the line and to close the valve when the sealed chamber is receiving gas from the high pressure side of the line.

JAMES L. YATES.
HARRY P. YOUNT.